(No Model.)
C. STATTMANN.
MUFF.
No. 412,427. Patented Oct. 8, 1889.
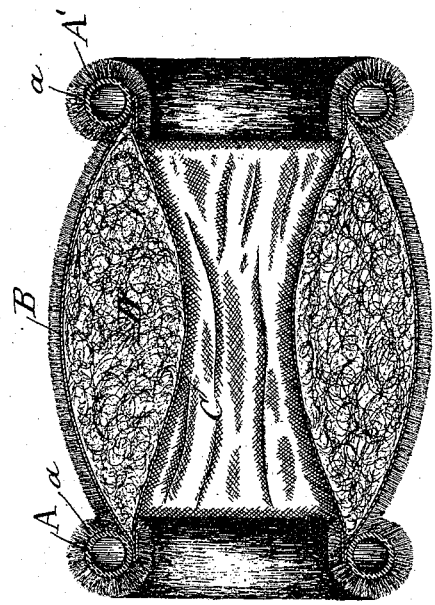
Witnesses:
Otto Lubkert.
Jens A. Johnson
Inventor:
Christian Stattmann
By Wm H Lotz
Attorney

UNITED STATES PATENT OFFICE.

CHRISTIAN STATTMANN, OF ST. PAUL, MINNESOTA.

MUFF.

SPECIFICATION forming part of Letters Patent No. 412,427, dated October 8, 1889.

Application filed March 15, 1889. Serial No. 303,498. (No model.)

*To all whom it may concern:*

Be it known that I, CHRISTIAN STATTMANN, a citizen of the United States of America, residing at St. Paul, in the county of Ramsey and State of Minnesota, have invented certain new and useful Improvements in Ladies' Muffs, of which the following is a specification, reference being had therein to the accompanying drawing.

This invention has for its object to provide a lady's muff that will retain its shape better; and it consists in a muff having ends formed of rubber-tube rings covered with fur and in the intermediate body of the muff united to the inward surface of these rings, all as will be more fully hereinafter described and specifically claimed.

The accompanying drawing represents a longitudinal section through the center of the muff, in which—

A A' denote rings made of rubber tubing and covered with fur *a*.

B is the fur covering, and C the silk or other inside lining of the muff filled between with hair, wool, or cotton D, and sewed together at their ends and to the inward surface of rings A.

It will be readily seen that a muff thus made will retain its shape, and will be warm and comfortable.

Instead of the rings A and A' being made of rubber tubing, tubing of other material that is elastic to a certain degree and at the same time is light may be used—as, for example, tubing made of paper-pulp.

What I claim is—

In a muff, the rubber-tube end rings A A', covered with fur, and the body of the muff made of fur covering B, silk lining C, and hair filling D, and secured between these rings A A', substantially as set forth.

In testimony whereof I affix my signature in presence of two witnesses.

CHRISTIAN STATTMANN.

Witnesses:
WILLIAM H. LOTZ,
CHAS. STATTMANN.